United States Patent
Kimura

(10) Patent No.: US 8,539,219 B2
(45) Date of Patent: Sep. 17, 2013

(54) INFORMATION ACCESS APPARATUS, PROGRAM STORAGE MEDIUM AND METHOD

(75) Inventor: Masatoshi Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1301 days.

(21) Appl. No.: 11/902,320

(22) Filed: Sep. 20, 2007

(65) Prior Publication Data

US 2008/0183654 A1 Jul. 31, 2008

(30) Foreign Application Priority Data

Dec. 27, 2006 (JP) ................................ 2006-352825

(51) Int. Cl.
*H04L 29/06* (2006.01)

(52) U.S. Cl.
USPC ............... 713/150; 713/193; 726/27; 726/28; 726/29

(58) Field of Classification Search
USPC .............. 713/150, 193; 726/27–29; 711/163
See application file for complete search history.

(56) References Cited

U.S. PATENT DOCUMENTS

| | | | |
|---|---|---|---|
| 5,239,495 A | 8/1993 | Nanno et al. | |
| 5,383,140 A | 1/1995 | Nanno et al. | |
| 5,581,772 A | 12/1996 | Nanno et al. | |
| 6,865,621 B2 | 3/2005 | Iwata | |
| 2001/0010067 A1* | 7/2001 | Nishiumi et al. | 711/163 |
| 2001/0056509 A1 | 12/2001 | Iwata | |
| 2005/0071591 A1* | 3/2005 | Goodman et al. | 711/163 |
| 2005/0094503 A1* | 5/2005 | Higashi | 369/30.36 |
| 2008/0288801 A1* | 11/2008 | Takahashi | 713/324 |

FOREIGN PATENT DOCUMENTS

| | | |
|---|---|---|
| JP | 03-027416 A | 2/1991 |
| JP | 06-004183 A | 1/1994 |
| JP | 10-27412 A | 1/1998 |
| JP | 10-039961 A | 2/1998 |
| JP | 11-143586 A | 5/1999 |
| JP | 2000-99211 A | 4/2000 |
| JP | 2002-6977 A | 1/2002 |
| JP | 2004-206530 | 7/2004 |
| JP | 2005-222679 | 8/2005 |
| JP | 2006-92627 | 4/2006 |
| WO | WO 2005066963 A1 * | 7/2005 |

OTHER PUBLICATIONS

Japanese Office Action, English-language Translation, mailed Apr. 12, 2011 for corresponding Japanese Application No. 2006-352825.
Japanese Office Action mailed Nov. 22, 2011 for corresponding Japanese Application No. 2006-352825, with partial English-language translation.

* cited by examiner

Primary Examiner — Justin T Darrow
(74) Attorney, Agent, or Firm — Fujitsu Patent Center

(57) ABSTRACT

An information access apparatus has an activation state permitting an information access to a recording medium, and a non-activation state permitting a change to the activation state. The apparatus comprises: a medium access section that permits, in the activation state, information access and ejection of the recording medium out of the information access apparatus; an instruction operating section that receives instruction operation for instructing the ejection of the recording medium; and an activation control section that controls change from the non-activation state to the activation state of the information access apparatus in such a manner that when the recording medium is loaded, change from the non-activation state to the activation state is permitted in response to reception of the instruction operation by the instruction operating section, and when the recording medium is not loaded, change from the non-activation state to the activation state is inhibited.

20 Claims, 9 Drawing Sheets

INFORMATION ACCESS APPARATUS, PROGRAM STORAGE MEDIUM AND METHOD

BACKGROUND OF THE INVENTION

1. Field of the Invention

The present invention relates to an information access apparatus for performing an information access to storage medium storing information, an information processing apparatus, an information access program storage medium, an information access method, and an information processing method.

2. Description of the Related Art

Recently, as an auxiliary recording medium for recording information in an information access apparatus such as a personal computer, CD-ROM and DVD that the access speed is high-speed, which are mass storage devices, have been widely used. According to those storage or recording devices, in order to prevent the accident to which the recording medium is taken out in the high velocity revolution and data is destroyed, when an ejection button provided with equipment is depressed, the recording medium is ejected after the revolution of the recording medium is completely stopped.

By the way, the power saving in addition to the speed-up of the information access has been strongly demanded for the personal computer etc. As a method of meeting this demand, there is proposed a method in which it has a usual activation mode wherein information is accessed, and a standby mode that is lower in power consumption than that of the activation mode, the standby mode being adapted to shift to the activation mode upon receipt of the mouse operation from a user, and it shifts a mode from the activation mode to the standby mode in the event that the user issues a mode shift instruction, or in the event that neither the mouse operation nor detaching of the recording medium are performed over a prescribed time. Japanese Patent Application Laid Open Gazette Toku-Kai. 2006-92627 discloses a technology in which when a recording medium is loaded into an information access apparatus, it returns from the standby mode to the activation mode. Japanese Patent Application Laid Open Gazette TokuKai. 2004-206530 discloses a technology in which it shifts from the activation mode to the standby mode while the recording medium is loaded into the information access apparatus. According to the technology disclosed in Japanese Patent Application Laid Open Gazette TokuKai. 2006-92627, it is possible to effectively change the modes between the activation mode and the standby mode in response to trigger which are generated at the time when the recording medium is put on and taken out. According to the technology disclosed in Japanese Patent Application Laid Open Gazette TokuKai. 2004-206530, it is possible to save trouble for taking out the recording medium to shift from the activation mode to the standby mode, and the return processing from the standby mode to the activation mode can be done in speed-up.

Moreover, it is general that the ejection button mentioned above not only is pushed to eject the recording medium but also two or more triggers are prepared like instruction of the recording medium's exhaust on the display screen. Japanese Patent Application Laid Open Gazette TokuKai. 2005-222679 discloses a technology in which ejection/load of the recording medium is performed in accordance with a state change of each two or more switches, and, in addition, a technology that stop/continuation of the power supply is automatically performed in accordance with the state of those switches. According to the technology disclosed in Japanese Patent Application Laid Open Gazette TokuKai. 2005-222689, power consumption can surely be suppressed even in a case where ejection/load of the recording medium is performed by various methods.

However, according to the conventional information access apparatus, there are often associated with types such as a type that the recording medium is not ejected with the turn off of the power supply even if the ejection button is depressed to take out the recording medium forgot to take after the power supply is turned off, and a type that the power supply of the information access apparatus inadvertently rises even if the ejection button is erroneously depressed. Thus, there are problems such a problem that it is made wait until the power supply of the information access apparatus rises in the state that the ejection button can be depressed after it turns on, and a problem that the electric power is uselessly consumed.

SUMMARY OF THE INVENTION

In view of the foregoing, it is an object of the present invention to provide an information access apparatus capable of suppressing power consumption and also capable of quickly ejecting recording medium, an information processing apparatus, an information access program storage medium, an information access method, and an information processing method.

To achieve the above-mentioned objects, the present invention provides an information access apparatus having an activation state permitting an information access to a recording medium on which information is recorded, and a non-activation state permitting a change to the activation state in response to a predetermined operation, the information access apparatus comprising:

a medium access section on which the recording medium is loaded, the medium access section permitting, in the activation state, the information access to the recording medium and an ejection of the recording medium out of the information access apparatus;

an instruction operating section that receives an instruction operation for instructing the ejection of the recording medium by the medium access section; and an activation control section that controls a change from the non-activation state to the activation state of the information access apparatus in such a manner that when the recording medium is loaded on the medium access section, it is permitted that the information access apparatus changes from the non-activation state to the activation state in response to reception of the instruction operation by the instruction operating section, and when the recording medium is not loaded on the medium access section, it is inhibited that the information access apparatus changes from the non-activation state to the activation state.

According to the information access apparatus of the present invention as mentioned above, when the recording medium is loaded on the medium access section, it is permitted that the information access apparatus changes from the non-activation state to the activation state in response to reception of the instruction operation by the instruction operating section. This feature makes it possible to quickly eject the recording medium in response to the operation. And when the recording medium is not loaded on the medium access section, it is inhibited that the information access apparatus changes from the non-activation state to the activation state, even if the instruction operation is applied. This feature makes it possible to avoid such troublesomeness that the medium access section is uselessly driven. Thus, it is possible to suppress power consumption.

In the information access apparatus according to the present invention as mentioned above, it is preferable that the activation control section is able to set up arbitrarily a trigger to change the information access apparatus from the non-activation state to the activation state, and the information access apparatus further comprises:

a non-activation control section that changes the information access apparatus from the activation state to the non-activation state in response to a predetermined operation; and a load confirmation section that confirms as to whether the recording medium is loaded on the medium access section when the non-activation control section changes the information access apparatus from the activation state to the non-activation state, and sets up a receipt of the instruction operation by the instruction operating section as a trigger to change the information access apparatus from the non-activation state to the activation state to the activation control section when it is confirmed that the recording medium is loaded on the medium access section.

According to the information access apparatus as mentioned above, the load confirmation section confirms as to whether the recording medium is loaded on the medium access section when the non-activation control section changes the information access apparatus from the activation state to the non-activation state. This feature makes it possible to avoid such troublesomeness that the power source turns on to confirm loading of the recording medium uselessly. Thus, it is possible to suppress power consumption.

In the information access apparatus according to the present invention as mentioned above, it is preferable that the information access apparatus further comprises a power source section that supplies an activation-time electric power necessary at time of the activation state of the information access apparatus, and supplies a non-activation-time electric power necessary at time of the non-activation state of the information access apparatus, the non-activation-time electric power being lower than the activation-time electric power, the medium access section is operative upon receipt of the activation-time electric power from the power source section, and the activation control section changes the information access apparatus from the non-activation state to the activation state by switching electric power supplied by the power source section from the non-activation-time electric power to the activation-time electric power.

Switching the electric power to be supplied from the power source section to the medium access section makes it possible to readily switch a mode between the activation state and the non-activation state.

In the information access apparatus according to the present invention as mentioned above, it is preferable that the information access apparatus further comprises a display section that indicates a matter that the recording medium is not loaded on the medium access section in such a way that the matter can be confirmed from the outside of the information access apparatus, when the activation control section inhibits change of the information access apparatus from the non-activation state to the activation state.

According to the information access apparatus as mentioned above, a user can confirm a matter that the recording medium is not loaded on the medium access section. This feature makes it possible to avoid such user's misunderstanding that the apparatus does not activate though the recording medium is loaded on the medium access section.

To achieve the above-mentioned objects, the present invention provides an information processing apparatus having an activation state permitting an information access to a recording medium on which information is recorded, and a non-activation state permitting a change to the activation state in response to a predetermined operation, the information access apparatus comprising:

a medium access section on which the recording medium is loaded, the medium access section permitting, in the activation state, the information access to the recording medium and an ejection of the recording medium out of the information access apparatus;

an instruction operating section that receives an instruction operation for instructing the ejection of the recording medium by the medium access section;

an activation control section that controls a change from the non-activation state to the activation state of the information processing apparatus in such a manner that when the recording medium is loaded on the medium access section, it is permitted that the information access apparatus changes from the non-activation state to the activation state in response to reception of the instruction operation by the instruction operating section, and when the recording medium is not loaded on the medium access section, it is inhibited that the information access apparatus changes from the non-activation state to the activation state; and a processing section that processes information accessed by the medium access section.

According to the information access apparatus as mentioned above, it is possible to suppress power consumption and quickly eject the recording medium.

To achieve the above-mentioned objects, the present invention provides an information access program storage medium storing an information access program which causes a computer to operate as an information access apparatus having an activation state permitting an information access to a recording medium on which information is recorded, and a non-activation state permitting a change to the activation state in response to a predetermined operation, the information access apparatus comprising:

a medium access section on which the recording medium is loaded, the medium access section permitting, in the activation state, the information access to the recording medium and an ejection of the recording medium out of the information access apparatus;

an instruction operating section that receives an instruction operation for instructing the ejection of the recording medium by the medium access section; and an activation control section that controls a change from the non-activation state to the activation state of the information access apparatus in such a manner that when the recording medium is loaded on the medium access section, it is permitted that the information access apparatus changes from the non-activation state to the activation state in response to reception of the instruction operation by the instruction operating section, and when the recording medium is not loaded on the medium access section, it is inhibited that the information access apparatus changes from the non-activation state to the activation state.

According to the information access program storage medium as mentioned above, it is possible to construct on a computer an information access apparatus capable of suppressing power consumption and quickly ejecting the recording medium.

To achieve the above-mentioned objects, the present invention provides an information access method in an information access apparatus having an activation state permitting an information access to a recording medium on which information is recorded, and a non-activation state permitting a change to the activation state in response to a predetermined operation, the information access method comprising:

an instruction operating step that receives an instruction operation for instructing the ejection of the recording medium by a medium access section on which the recording medium is loaded, the medium access section permitting, in the activation state, the information access to the recording medium and an ejection of the recording medium out of the information access apparatus; and an activation control step that controls a change from the non-activation state to the activation state of the information access apparatus in such a manner that when the recording medium is loaded on the medium access section, it is permitted that the information access apparatus changes from the non-activation state to the activation state in response to reception of the instruction operation by the instruction operating section, and when the recording medium is not loaded on the medium access section, it is inhibited that the information access apparatus changes from the non-activation state to the activation state.

To achieve the above-mentioned objects, the present invention provides an information processing method in an information access apparatus having an activation state permitting an information access to a recording medium on which information is recorded, and a non-activation state permitting a change to the activation state in response to a predetermined operation, the information processing method comprising:

an instruction operating step that receives an instruction operation for instructing the ejection of the recording medium by a medium access section on which the recording medium is loaded, the medium access section permitting, in the activation state, the information access to the recording medium and an ejection of the recording medium out of the information access apparatus;

an activation control step that controls a change from the non-activation state to the activation state of the information access apparatus in such a manner that when the recording medium is loaded on the medium access section, it is permitted that the information access apparatus changes from the non-activation state to the activation state in response to reception of the instruction operation by the instruction operating section, and when the recording medium is not loaded on the medium access section, it is inhibited that the information access apparatus changes from the non-activation state to the activation state; and a processing step that processes information accessed by the medium access section.

According to the information access method and the information processing method as mentioned above, it is possible to suppress power consumption and quickly eject the recording medium.

DETAILED DESCRIPTION OF PREFERRED EMBODIMENTS

Embodiments of the present invention will be described with reference to the accompanying drawings.

Figure 1:
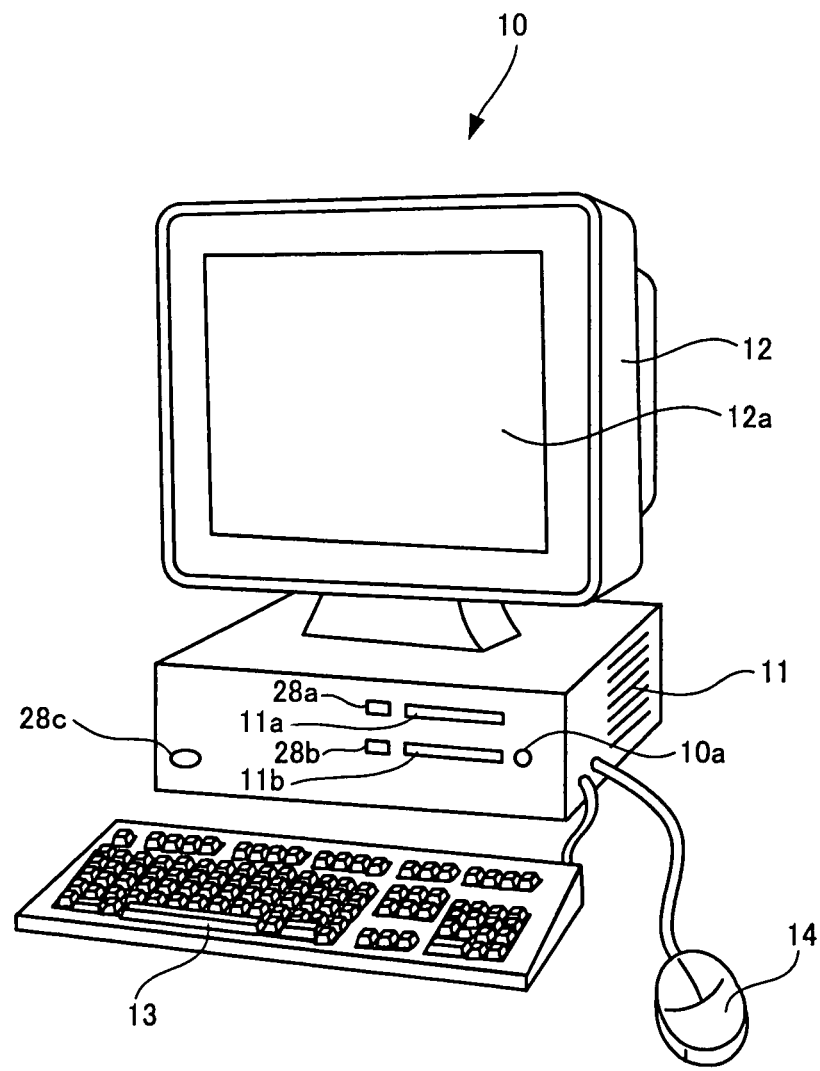
FIG. 1 is a schematic perspective view of a personal computer, to which an embodiment of an information access apparatus of the present invention is applied.

FIG. 1 is a schematic perspective view of a personal computer, to which an embodiment of an information access apparatus of the present invention is applied.

A personal computer 10 of the present embodiment is provided with an activation mode in which an information access is performed, a sleep mode in which when operation with mouse and keyboard is not input over a prescribed time, a display screen is turned off to save power consumption less than that of the activation mode, a rest mode in which upon receipt of a mode change instruction from a user, individual sorts of processing in the personal computer 10 are temporarily stopped to save power consumption further less than that of the sleep mode, and a power source off mode in which a power source is turned off. A change over of those modes makes it possible to suppress the power consumption. Also in the rest mode and the power source off mode, an electric power is partially always supplied to the personal computer 10. Therefore, it is possible to accept depression of the power source button. Thus, when the power source button is depressed in the rest mode, the display screen is returned to the state before the rest mode. When the power source button is depressed in the power source off mode, the OS is activated over again.

The personal computer 10 comprises, on an external appearance, a main frame unit 11, a display unit 12 for displaying various sorts of information on a display screen 12a in accordance with an instruction from the main frame unit 21, a keyboard 13 for inputting various sorts of information to the main frame unit 11 in accordance with a key operation, and a mouse 14 for inputting an instruction according to, for example, an icon and the like, through designation of an optional position on the display screen 12a, the icon and the like being displayed on the position on the display screen 12a. The main frame unit 11 has a floppy disk (FD) mounting slot 11a for mounting a floppy disk (FD), a FD switch 28a for ejecting a FD mounted on the FD mounting slot 11a, a disk mounting slot 11b for mounting a disk medium (for example, CD-ROM and DVD), an ejection switch 28b for ejecting a disk medium mounted on the disk mounting slot 11b, a power source switch 28c for switching turn on and off of the power source of the personal computer 10, and a LED 10a that informs of the fact that no disk medium is mounted on the disk mounting slot 11b. The LED 10a corresponds to an example of the display section referred to in the present invention. The ejection switch 28b corresponds to an example of the instruction operating section referred to in the present invention.

According to the present embodiment, there is loaded a slot-in-type of disk device in which a disk medium is directly inserted into the disk mounting slot 11b for loading, and when the ejection switch 28b is depressed, the disk medium is ejected from the disk mounting slot 11b. Sorts of the disk medium are associated with applications, respectively, beforehand. When the disk medium is loaded onto the disk mounting slot 11b, the associated application is executed. According to the present embodiment, when the CD-ROM is loaded, a music playback application for reproducing a music recorded on the CD-ROM is executed, and when the DVD is loaded, a dynamic picture image audiovisual application for viewing a dynamic picture image recorded on the DVD is executed.

Figure 2:
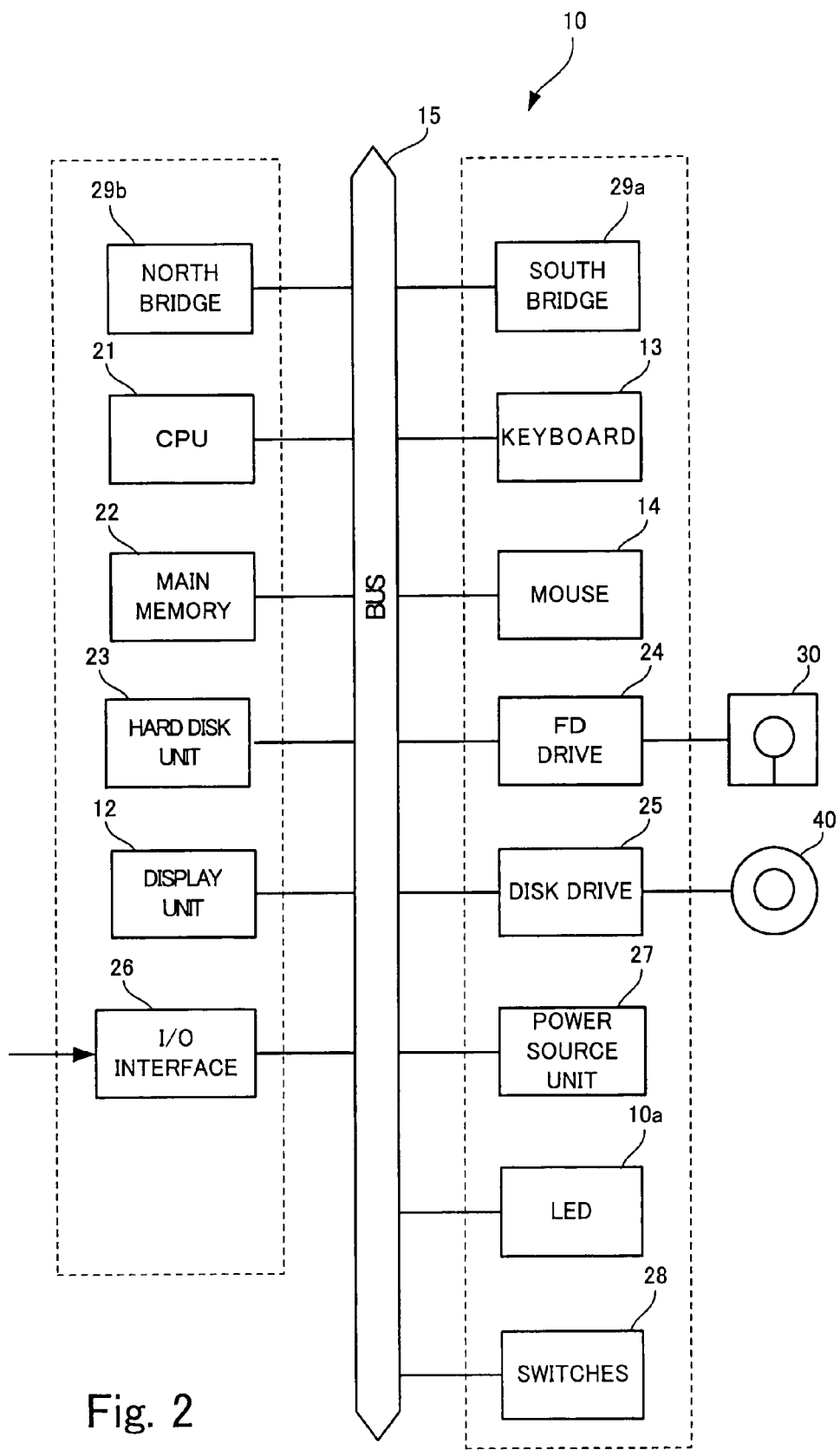
FIG. 2 is a hardware structural view of the personal computer.

FIG. 2 is a hardware structural view of the personal computer.

The main frame unit 11 comprises, in addition to the display unit 12, the keyboard 13, and the mouse 14 as also shown in FIG. 1, a CPU 21 for controlling the personal computer 10 in its entirety, a main memory 22 in which a program stored in a hard disk unit 23 is read out and developed for execution by the CPU 21, the hard disk unit 23 for saving various types of programs and data, an FD drive 24 for accessing a floppy disk (FD) 30 mounted thereon, a disk drive 25 for accessing a disk medium 40 mounted thereon, an input/output interface 26 connected to various types of devices to receive and transmit various types of data, a power source unit 27 for supplying electric power to individual elements of the personal computer 10, various types of switches 28 including the FD switch 28a, the ejection switch 28b, and the power source switch 28c shown in FIG. 1, a north bridge 29b for controlling transmission of data among individual elements (the CPU 21, the main memory 22, the hard disk unit 23, the display unit 12, and the input/output interface 26) which appear at the left side of FIG. 2, and a south bridge 29a for controlling transmission of data among individual elements (the LED 10a, the keyboard 13, the mouse 14, the FD drive 24, the disk drive 25, the power source unit 27, and the switches 28) which appear at the right side of FIG. 2. These various types of elements are mutually connected via a bus 15. Transmission of data is performed also between the north bridge 29b and the south bridge 29a. An instruction from the CPU 21 is transmitted via the north bridge 29b and the south bridge 29a to the various types of elements. The power source unit 27 corresponds to an example of the power source section referred to in the present invention. The disk drive 25 corresponds to an example of the medium access section referred to in the present invention. The disk medium 40 corresponds to an example of the recording medium referred to in the present invention.

Figure 3:
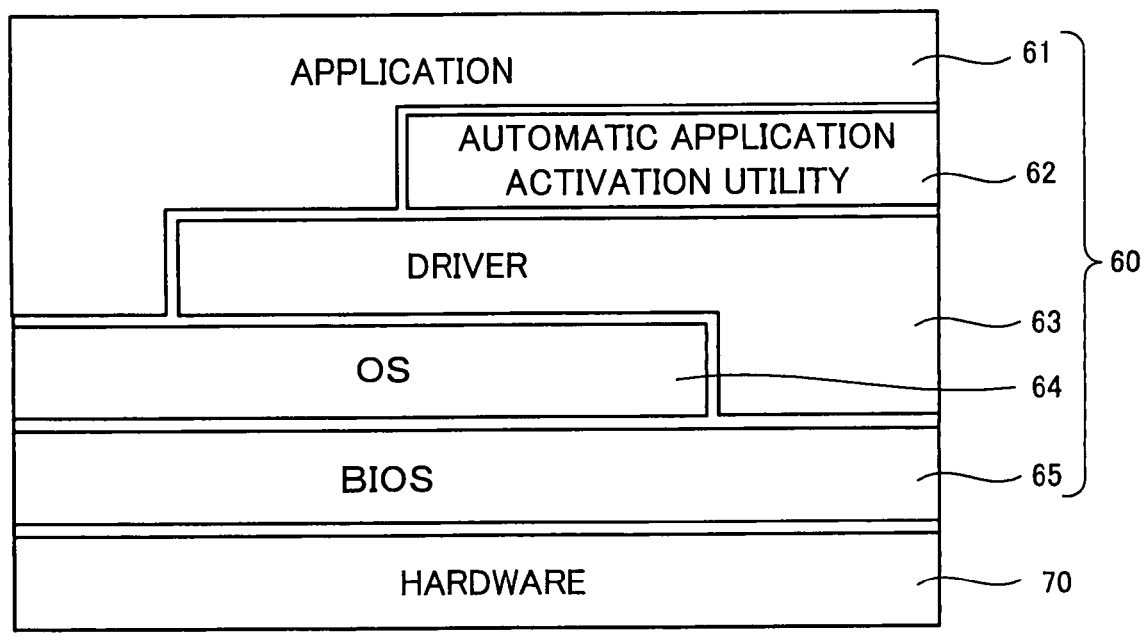
FIG. 3 is a view useful for understanding an example of the hierarchical relation between hardware and software in the personal computer.

FIG. 3 is a view useful for understanding an example of the hierarchical relation between hardware and software in the personal computer.

FIG. 3 shows the hierarchical relation including automatic application activation utility 62 for automatically activating an application according to a type of the disk medium.

The personal computer 10 is provided with various sorts of software 60 (including firmware) on various sorts of hardware 70 as shown in FIG. 3. On the hardware 70, there exists BIOS 65 consisting of programs for performing initialization and control of the hardware 70. On the BIOS 65, there exist an operation system (OS) 64 for activating the personal computer 10, a driver program 63 for providing a control interface for utilization of the hardware 70 by an application 61, the automatic application activation utility 62 for automatically activating the application 61, and the application 61 such as the above mentioned music playback application and dynamic picture image audiovisual application.

The above-mentioned description is concerned with the basic structure of the personal computer 10. Next, there will be explained the mode switching.

Figure 4:
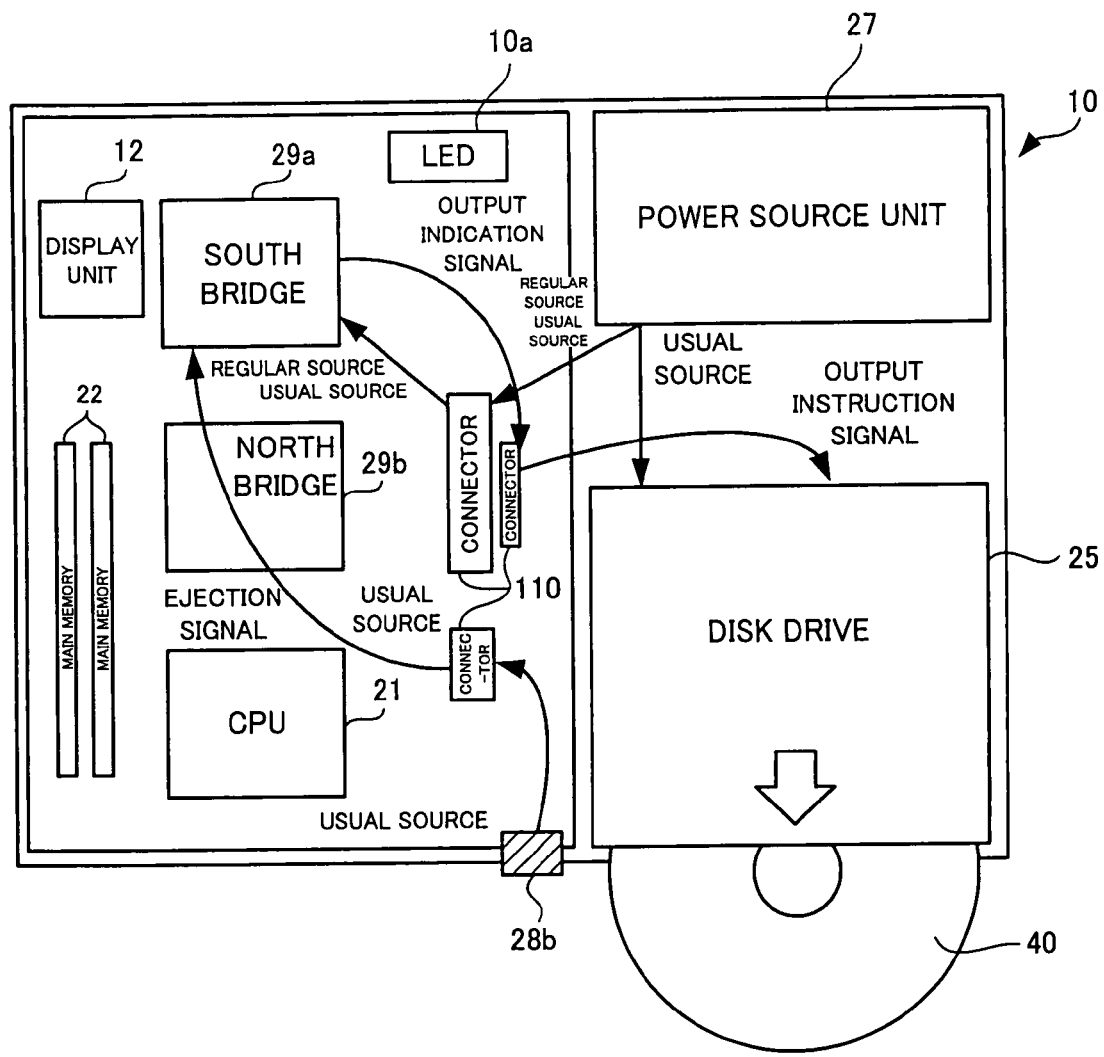
FIG. 4 is a view showing main elements of the personal computer.

FIG. 4 is a view showing main elements of the personal computer.

As seen from FIG. 4, the personal computer 10 further comprises, in addition to the power source unit 27, the disk drive 25, the display unit 12, the CPU 21, the main memory 22, the south bridge 29a, and the north bridge 29b, which are shown in FIG. 2, the ejection switch 28b included in the switch 28, and a connector 110 for connecting the power source unit 27, the disk drive 25 and the switch 28 with the south bridge 29a. In the hierarchical relation shown in FIG. 3, the hardware 70 of FIG. 3 corresponds to the south bridge 29a shown in FIG. 4. The BIOS 65 of FIG. 3 is constructed in the connector 110 of FIG. 4. The OS 64, the driver 63, and the automatic application activation utility 62 are constructed in the south bridge 29a. The application 61 is constructed in the CPU 21. The south bridge 29a corresponds to an example of the activation control section referred to in the present invention, and an example of the non-activation control section referred to in the present invention as well.

Figure 5:
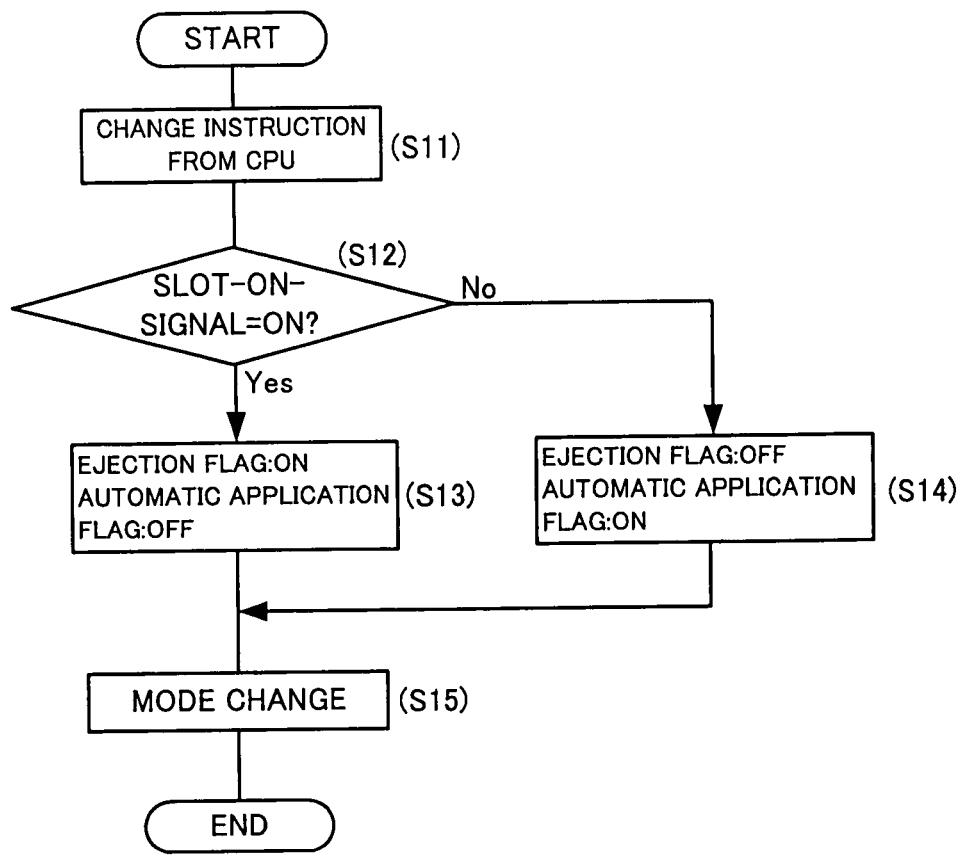
FIG. 5 is a flowchart useful for understanding a series of processing wherein a mode is changed over.

FIG. 5 is a flowchart useful for understanding a series of processing wherein a mode is changed over.

The south bridge 29a monitors a trigger for switching the activation mode, the sleep mode, the rest mode, and the power source off mode. According to the present embodiment, when a user depresses the power source switch 28c shown in FIG. 1 in the state that the personal computer 10 is activated, the mode is changed to the "power source off mode" for turning off the power source. When the user instructs a mode change to the "rest mode" using the mouse 14 and the like, the mode is changed to the "rest mode" in which processing to be executed by the personal computer 10 is rested. In the event that the user does not perform the mouse operation or the keyboard operation more than prescribed time, the mode is changed to the "sleep mode" in which the display screen is turned off. In the event that the user performs the mouse operation or the keyboard operation in the "sleep mode", or the user depresses the power source switch 28c in the "rest mode", the mode is changed to the "activation mode" in which the information access is permissible. When triggers are generated, the trigger is transmitted via the south bridge 29a and the north bridge 29b to the CPU 100. The CPU 100 determines the switching mode in accordance with the transmitted triggers, and instructs switching to the determined mode to individual elements constructing the personal computer 10 via the north bridge 29b (step S11 of FIG. 5).

When the mode change is instructed, the BIOS 65, which is constructed in the connector 110, confirms whether the disk medium 40 is loaded onto the disk drive 25 (step S12 of FIG. 5).

Figure 6:
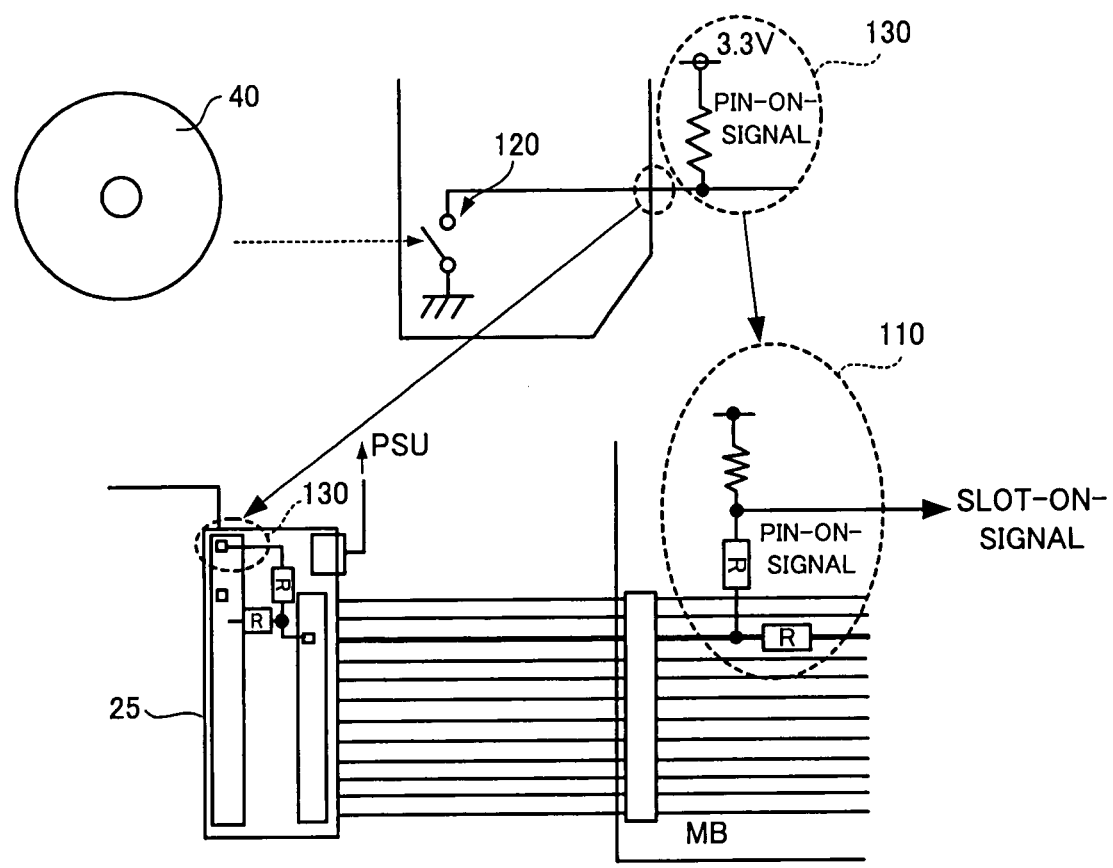
FIG. 6 is a structural view of a contact portion of a disk drive 25 and a connector.

FIG. 6 is a structural view of a contact portion of a disk drive 25 and a connector.

When the disk medium 40 is loaded onto the disk drive 25, a loading switch 120 switches on, so that it is transmitted to the connector 110 that a pin 130, which is associated with information of "loading of the disk medium 40" beforehand, turns on. When the pin 130 turns on, the BIOS 65 of the connector 110 transmits to the south bridge 29a shown in FIG. 3 a slot turn-on signal indicative of the fact that the disk medium 40 is loaded. When south bridge 29a receives the slot turn-on signal, it sets up a slot turn-on flag indicative of the loading state ("1: loading", "0: non-loading") of the disk medium 40 prepared in the incorporated non-volatile storage (register) to "1: loading".

Returning to FIG. 5, the explanation will be explained.

When the mode change is instructed, the BIOS 65 obtains the value of the slot turn-on flag from the south bridge 29a. In the event that the slot turn-on flag is the "1: loading" (step S12 of FIG. 5: Yes), the BIOS 65 sets up an ejection flag indicative of permission/non-permission ("1: permission", "0: non-permission") of the ejection of the disk medium 40 by depression of the ejection switch 28b, which is prepared in the south bridge 29a, to "1: permission", and sets up an automatic application flag indicative of permission/non-permission ("1: permission", "0: non-permission") of the activation of the automatic application, to "0: non-permission". In the event that the slot turn-on flag is the "0: non-loading" (step S12 of FIG. 5: No), the BIOS 65 sets up the ejection flag to "0: non-permission", and sets up the automatic application flag to "1: permission".

When every flag is renewed, the south bridge 29a controls electric power to be supplied from the power source unit 27 to individual elements shown in the right side of FIG. 2 in accordance with the mode change instruction transmitted from the CPU 100, and north bridge 29b controls electric power to be supplied from the power source unit 27 to individual elements shown in the left side of FIG. 2 in accordance with the mode change instruction transmitted from the CPU 100 (step S15 of FIG. 2). According to the present embodiment, when the mode change to the "activation mode" is instructed, the electric power to be supplied from the power source unit 27 to individual elements shown in FIG. 2 is regulated to a predetermined usual electric power. When the mode change to the "sleep mode" is instructed, the electric power to be supplied from the power source unit 27 to the display unit 12 and the disk drive 25 is stopped. When the mode change to the "rest mode" is instructed, the electric power, that is lower than the usual electric power, is supplied to the south bridge 29a and connector 110, and the power supply to other individual elements is stopped. When the mode change to the "power source off mode" is instructed, the power supply to the whole elements shown in FIG. 3 is stopped.

The mode change is executed in the manner as mentioned above.

When the ejection switch 28b is depressed in the state of the "sleep mode", the "rest mode", or the "power source off mode", the disk drive 25 may rise though the disk medium is absent, so that the electric power is uselessly consumed. To the contrary, in the event that the disk medium is not ejected though the ejection switch 28b is depressed, even if the disk medium is present, there is a need to turn on the power source over again and in addition depress the ejection switch 28b over again. This involves a problem that it takes a great deal of time. Hereinafter there will be explained processing wherein the ejection switch 28b is depressed.

Figure 7:
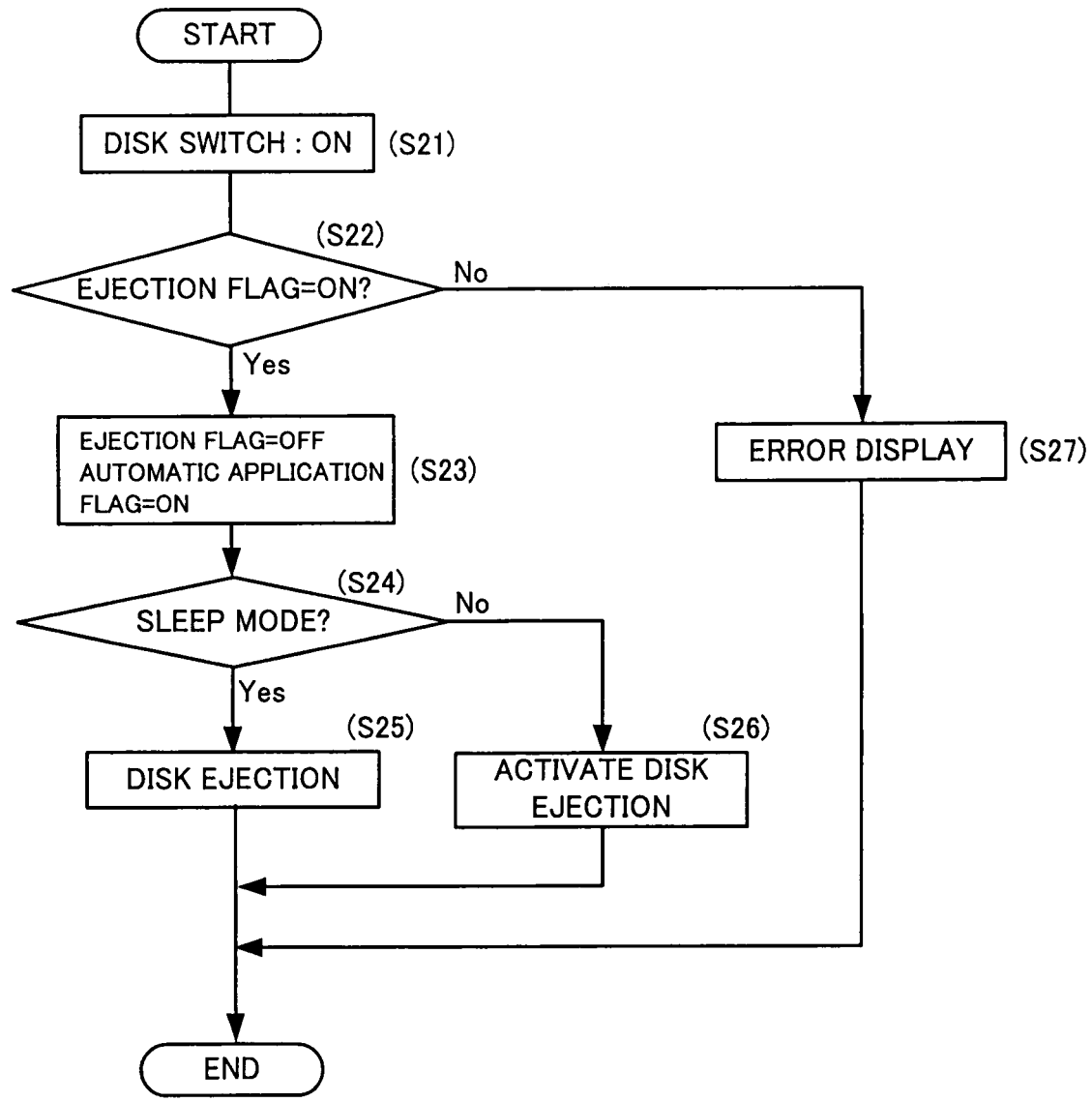
FIG. 7 is a flowchart useful for understanding a series of processing wherein an ejection switch is depressed in states of "sleep mode", "rest mode", and "power source off mode".

FIG. 7 is a flowchart useful for understanding a series of processing wherein an ejection switch is depressed in states of "sleep mode", "rest mode", and "power source off mode".

When a user depresses the ejection switch 28b in the state of the "sleep mode", the "rest mode", or the "power source off mode", the information is transmitted via the connector 110 to the south bridge 29a (step S21 of FIG. 7).

The south bridge 29a obtains the ejection flag indicative of permission/non-permission of the ejection of the disk medium 40 by depression of the ejection switch 28b. In the event that the ejection flag is the "1: permission" (step S22 of FIG. 7: Yes), the south bridge 29a initializes the value of the ejection flag ("0: non-permission"), and also initializes ("1: permission") the value of the automatic application flag (step S23 of FIG. 7: Yes). In the event that the mode is the "sleep mode" (step S24 of FIG. 7: Yes), the south bridge 29a regulates the electric power to be supplied from the power source unit 27 to the disk drive 25 to an ejection power capable of ejecting the disk medium, and transmits an output instruction signal via the connector 110 to the disk drive 25 so as to eject the disk medium (step S25 of FIG. 7: Yes). In the event that the mode is "rest mode", and the "power source off mode" other than the "sleep mode" (step S24 of FIG. 7: No), the south bridge 29a supplies the usual electric power from the power source unit 27 to the personal computer 10 in its entirety after the ejection of the disk medium, and switches the mode to the "activation mode" (step S26 of FIG. 7).

In the step S22 of FIG. 7, when the ejection flag is "0: non-permission" (step S22 of FIG. 7: No), the south bridge 29a does not eject the disk medium and causes the LED 10a to emit light (step S27 of FIG. 7), and informs the user of a message that "the disk medium is not loaded".

Thus, according to the present embodiment, because the disk drive 25 and the like do not start even if the ejection switch 28b is pushed when the disk medium is not loaded, power consumption can be decreased. On the other hand, because the personal computer 10 starts automatically only by pushing the ejection switch 28b even if the power supply turns off when the disk medium is loaded, so that the disk medium is ejected, it is possible to save trouble that the user turns on the power source by himself/herself over again and pushes the ejection switch 28b again.

Moreover, according to the present embodiment, it is possible to return the mode from the "sleep mode", the "rest mode", and the "power source off mode" to the "activation mode" by not only the mouse operation and the power supply button, etc. but also loading the disk medium. In the event that the mode is returned to the "activation mode" in accordance with the trigger by the mouse operation and the power supply button, the mode is restored to the state before the "activation mode". However, in the event that the mode is returned to the "activation mode" in accordance with the trigger by loading the disk medium, the application according to the sort of the disk medium is automatically activated. Hereinafter, there will be explained a flow of processing where a disk medium is mounted.

Figure 8:
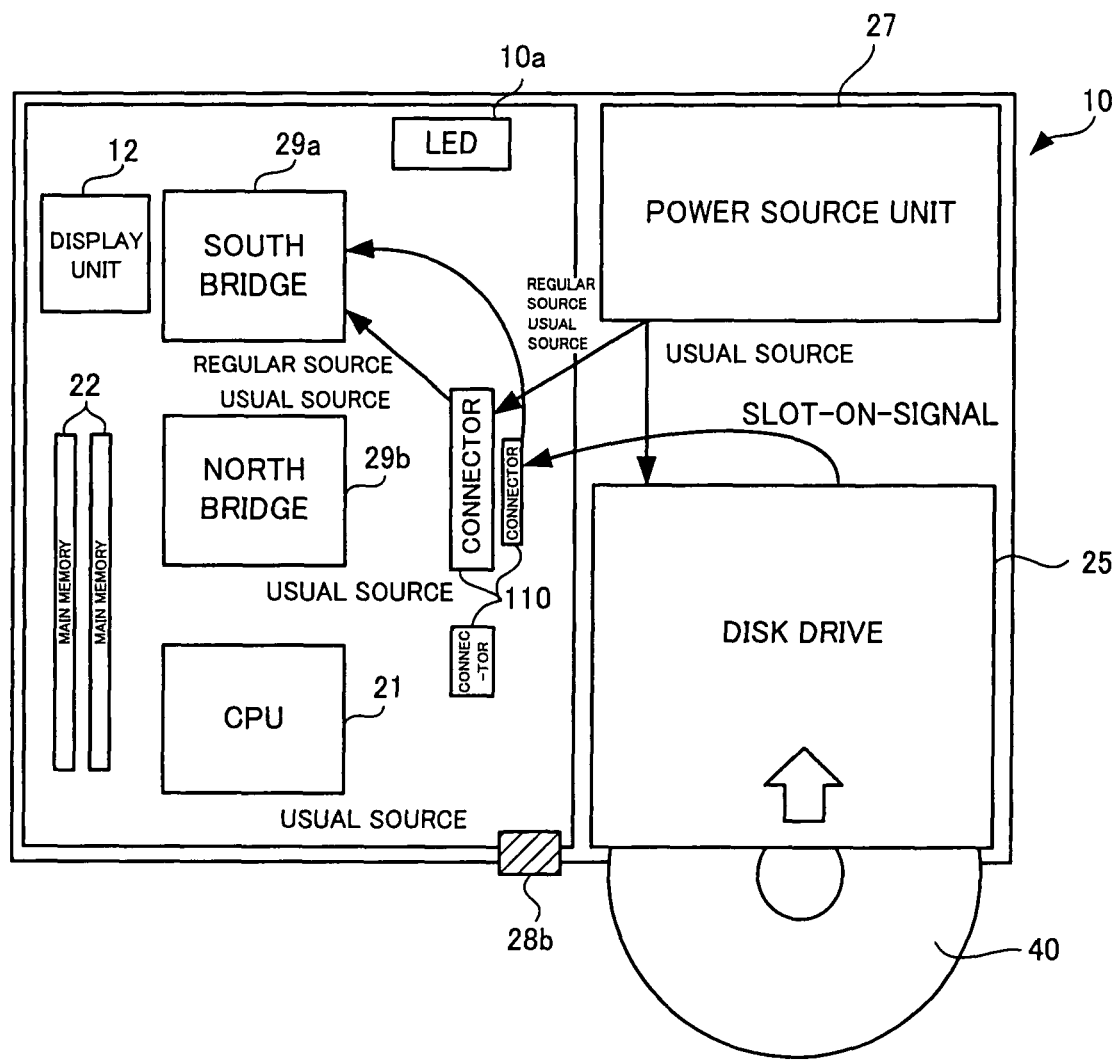
FIG. 8 is an illustration useful for understanding a flow of an instruction where a disk medium is mounted.
Figure 9:
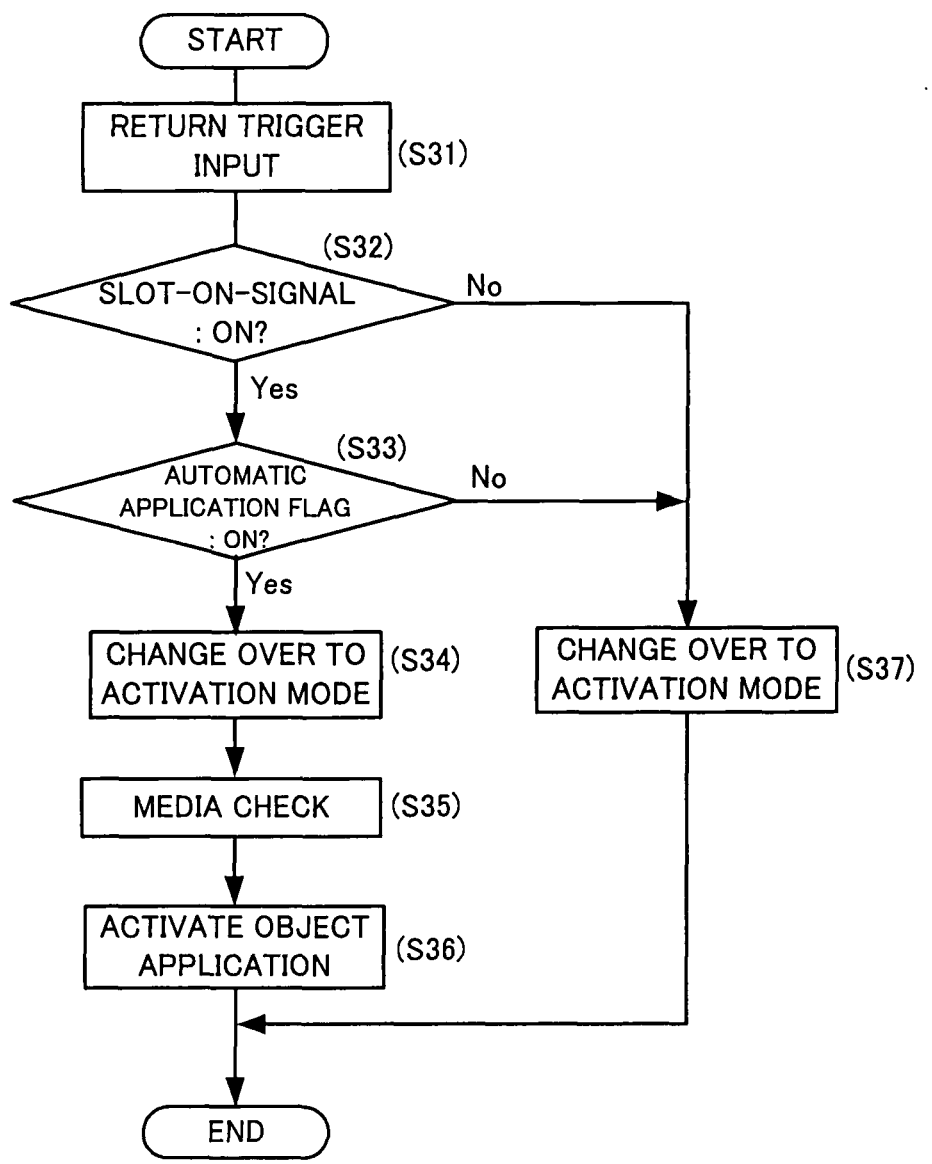
FIG. 9 is a flowchart useful for understanding a series of processing wherein a mode is returned from "sleep mode", "rest mode", and "power source off mode" to "activation mode".

FIG. 8 is an illustration useful for understanding a flow of an instruction where a disk medium is mounted. FIG. 9 is a flowchart useful for understanding a series of processing wherein a mode is returned from "sleep mode", "rest mode", and "power source off mode" to "activation mode".

When there is inputted a trigger for returning the mode from the "sleep mode", the "rest mode", and the "power source off mode" to the "activation mode" (step S31 of FIG. 9), the trigger is transmitted from the connector 110 to the south bridge 29a. According to the present embodiment, when the mouse operation or the keyboard operation is performed in the "sleep mode"; the power source switch 28c shown in FIG. 1 is depressed in the "rest mode" or the "power source off mode"; or the disk medium 40 is loaded, the mode change to the "activation mode" is instructed in response to those operations.

As explained in conjunction with FIG. 6, when the disk medium 40 is loaded, the slot turn-on signal is transmitted via the BIOS 65 of the connector 110 to the south bridge 29a.

The south bridge 29a obtains the trigger transmitted from the BIOS 65 of the connector 110. The automatic application activation utility 62, which is constructed in the south bridge 29a, obtains the value of the automatic application flag stored in a register in the event that it receives the slot turn-on signal in form of the trigger (step S32 of FIG. 9: Yes). In the event that the automatic application flag is "1: permission" (step S33 of FIG. 9: Yes), the south bridge 29a supplies the usual electric power from the power source unit 27 to the personal computer 10 in its entirety after the ejection of the disk medium, and switches the mode to the "activation mode" (step S34 of FIG. 9).

While the mode is changed to the "activation mode", the automatic application activation utility 62, which is constructed in the south bridge 29a, discriminates the sort of the disk medium 40 loaded on the disk drive 25 (step S35 of FIG. 9). As mentioned above, according to the present embodiment, "the CD-ROM and the music playback application" and "the DVD and dynamic picture image audiovisual application" are associated with one another, respectively. In the automatic application activation utility 62 of the south bridge 29a, the sort of the application, which is associated with the discriminated sort of the disk medium 40, is transmitted via the south bridge 29a to the CPU 21.

In the CPU 21, the application transmitted from the automatic application activation utility 62 of the south bridge 29a is activated (step S36 of FIG. 9). As a result, the disk drive 25 automatically executes the information access to the loaded disk medium 40.

In the event that a trigger other than the slot turn-on signal is entered in the step S32 of FIG. 9 (step S32 of FIG. 9: No), or in the event that the automatic application flag is "0: non-permission" even if the slot turn-on signal is entered (step S33 of FIG. 9: No), the south bridge 29a switches the mode to the "activation mode" (step S37 of FIG. 9), but does not perform the automatic activation of the application.

Thus, according to the present embodiment, the application, which meets the disk medium, is automatically activated only when the mode is changed to the activation mode by loading the disk medium. Therefore, the user can access the disk medium without doing a troublesome operation.

According to the present embodiment, there is explained, by way of example, a slot-inter type of disk drive in which a disk medium is directly inserted into a disk loading slot for loading. However, it is acceptable that the medium accessing section referred to in the present invention is one in which a recording medium is mounted on a tray and the tray is inserted or ejected into or from a medium loading slot.

According to the present embodiment, there is explained an example in which an information access apparatus of the present invention is applied to a personal computer. However, it is acceptable that the information access apparatus of the present invention is applied to an external information access apparatus connected with the personal computer and the like.

According to the present invention, it is possible to provide an information access apparatus capable of suppressing power consumption and also capable of quickly ejecting recording medium, an information processing apparatus, an information access program storage medium, an information access method, and an information processing method.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An information access apparatus having an activation state permitting an information access to a recording medium on which information is recorded, and a non-activation state prohibiting the information access to the recording medium and being changed thereto from the activation state in response to a predetermined operation, the information access apparatus comprising:

a medium access section which is supplied with electric power in the activation state and is not supplied with electric power in the non-activation state and on which the recording medium is loaded, the medium access section to permit, in the activation state, the information access to the recording medium and an ejection of the recording medium out of the information access apparatus;

an instruction operating section that receives an instruction operation for instructing the ejection of the recording medium by the medium access section; and an activation control section that causes the information access apparatus to change from the non-activation state to the activation state in response to reception of the instruction operation by the instruction operating section when the recording medium is loaded on the medium access section, and does not cause the information access apparatus to change from the non-activation state to the activation state when the recording medium is not loaded on the medium access section at the time of the reception of the instruction operation.

2. The information access apparatus according to claim 1, wherein the activation control section is able to set up arbitrarily a trigger to change the information access apparatus from the non-activation state to the activation state, and the information access apparatus further comprises:

a non-activation control section that changes the information access apparatus from the activation state to the non-activation state in response to a predetermined operation; and a load confirmation section that confirms as to whether the recording medium is loaded on the medium access section when the non-activation control section changes the information access apparatus from the activation state to the non-activation state, and sets up a receipt of the instruction operation by the instruction operating section as a trigger to change the information access apparatus from the non-activation state to the activation state to the activation control section when it is confirmed that the recording medium is loaded on the medium access section.

3. The information access apparatus according to claim 1, further comprises a power source section that supplies an activation-time electric power necessary at time of the activation state of the information access apparatus, and supplies a non-activation-time electric power necessary at time of the non-activation state of the information access apparatus, the non-activation-time electric power being lower than the activation-time electric power, the medium access section is operative upon receipt of the activation-time electric power from the power source section, and the activation control section changes the information access apparatus from the non-activation state to the activation state by switching electric power supplied by the power source section from the non-activation-time electric power to the activation-time electric power.

4. The information access apparatus according to claim 1, further comprises a display section that indicates a matter that the recording medium is not loaded on the medium access section in such a way that the matter can be confirmed from the outside of the information access apparatus, when the activation control section does not cause the information access apparatus to change from the non-activation state to the activation state.

5. An information processing apparatus having an activation state permitting an information access to a recording medium on which information is recorded, and a non-activation state prohibiting the information access to the recording medium and being changed thereto from the activation state in response to a predetermined operation, the information processing apparatus comprising:

a medium access section which is supplied with electric power in the activation state and is not supplied with electric power in the non-activation state and on which the recording medium is loaded, the medium access section to permit, in the activation state, the information access to the recording medium and an ejection of the recording medium out of the information processing apparatus;

an instruction operating section that receives an instruction operation for instructing the ejection of the recording medium by the medium access section;

an activation control section that causes the information processing apparatus to change from the non-activation state to the activation state in response to reception of the instruction operation by the instruction operating section when the recording medium is loaded on the medium access section, and does not cause the information processing apparatus to change from the non-activation state to the activation state when the recording medium is not loaded on the medium access section at the time of the reception of the instruction operation; and a processing section that processes information accessed by the medium access section.

6. The information processing apparatus according to claim 5, wherein the activation control section is able to set up arbitrarily a trigger to change the information processing apparatus from the non-activation state to the activation state, and the information processing apparatus further comprises:

a non-activation control section that changes the information processing apparatus from the activation state to the non-activation state in response to a predetermined operation; and a load confirmation section that confirms as to whether the recording medium is loaded on the medium access section when the non-activation control section changes the information processing apparatus from the activation state to the non-activation state, and sets up a receipt of the instruction operation by the instruction operating section as a trigger to change the information processing apparatus from the non-activation state to the activation state to the activation control section when it is confirmed that the recording medium is loaded on the medium access section.

7. The information processing apparatus according to claim 5, further comprises a power source section that supplies an activation-time electric power necessary at time of the activation state of the information processing apparatus, and supplies a non-activation-time electric power necessary at time of the non-activation state of the information processing apparatus, the non-activation-time electric power being lower than the activation-time electric power, the medium access section is operative upon receipt of the activation-time electric power from the power source section, and the activation control section changes the information processing apparatus from the non-activation state to the activation state by switching electric power supplied by the power source section from the non-activation-time electric power to the activation-time electric power.

8. The information processing apparatus according to claim 5, further comprises a display section that indicates a matter that the recording medium is not loaded on the medium access section in such a way that the matter can be confirmed from the outside of the information processing apparatus, when the activation control section does not cause the information processing apparatus to change from the non-activation state to the activation state.

9. A non-transitory information access program storage medium storing an information access program which causes a computer to operate as an information access apparatus having an activation state permitting an information access to a recording medium on which information is recorded, and a non-activation state prohibiting the information access to the recording medium and being changed thereto from the activation state in response to a predetermined operation, the information access apparatus comprising:

a medium access section which is supplied with electric power in the activation state and is not supplied with electric power in the non-activation state and on which the recording medium is loaded, the medium access section to permit, in the activation state, the information access to the recording medium and an ejection of the recording medium out of the information access apparatus;

an instruction operating section that receives an instruction operation for instructing the ejection of the recording medium by the medium access section; and an activation control section that causes the information access apparatus to change from the non-activation state to the activation state in response to reception of the instruction operation by the instruction operating section when the recording medium is loaded on the medium access section, and does not cause the information access apparatus to change from the non-activation state to the activation state when the recording medium is not loaded on the medium access section at the time of the reception of the instruction operation.

10. The non-transitory information access program storage medium according to claim 9, wherein the activation control section is able to set up arbitrarily a trigger to change the information access apparatus from the non-activation state to the activation state, and the information access apparatus further comprises:

a non-activation control section that changes the information access apparatus from the activation state to the non-activation state in response to a predetermined operation; and a load confirmation section that confirms as to whether the recording medium is loaded on the medium access section when the non-activation control section that changes the information access apparatus from the activation state to the non-activation state, and sets up a receipt of the instruction operation by the instruction operating section as a trigger to change the information access apparatus from the non-activation state to the activation state to the activation control section when it is confirmed that the recording medium is loaded on the medium access section.

11. The non-transitory information access program storage medium according to claim 9, wherein the information access apparatus further comprises a power source section that supplies an activation-time electric power necessary at time of the activation state of the information access apparatus, and supplies a non-activation-time electric power necessary at time of the non-activation state of the information access apparatus, the non-activation-time electric power being lower than the activation-time electric power, the medium access section is operative upon receipt of the activation-time electric power from the power source section, and the activation control section changes the information access apparatus from the non-activation state to the activation state by switching electric power supplied by the power source section from the non-activation-time electric power to the activation-time electric power.

12. The non-transitory information access program storage medium according to claim 9, wherein the information access apparatus further comprises a display section that indicates a matter that the recording medium is not loaded on the medium access section in such a way that the matter can be confirmed from the outside of the information access apparatus, when the activation control section does not cause the information processing apparatus to change from the non-activation state to the activation state.

13. An information access method in an information access apparatus having an activation state permitting an information access to a recording medium on which information is recorded, and a non-activation state prohibiting the information access to the recording medium and being changed thereto from the activation state in response to a predetermined operation, the information access method comprising:

receiving an instruction operation for instructing the ejection of the recording medium by a medium access section which is supplied with electric power in the activation state and is not supplied with electric power in the non-activation state and on which the recording medium is loaded; and activation-controlling including changing from the non-activation state to the activation state in response to the receiving when the recording medium is loaded on the medium access section, while not changing from the non-activation state to the activation state in response to the receiving of the instruction operation when the recording medium is not loaded on the medium access section at the time of the causes of the instruction operation.

14. The information access method according to claim 13, wherein the activation-controlling includes setting up arbitrarily a trigger to change the information access apparatus from the non-activation state to the activation state, and the information access method further comprises:

non-activation-controlling including changing the information access apparatus from the activation state to the non-activation state in response to a predetermined operation; and load-confirming including confirming as to whether the recording medium is loaded on the medium access section when the non-activation-controlling changes the information access apparatus from the activation state to the non-activation state, and setting up a receipt of the instruction operation by the receiving of the instruction operation as a trigger to change the information access apparatus from the non-activation state to the activation state to the activation-controlling when it is confirmed that the recording medium is loaded on the medium access section.

15. The information access method according to claim 13, further comprises power-supplying including supplying an activation-time electric power necessary at time of the activation state of the information access apparatus, and supplying a non-activation-time electric power necessary at time of the non-activation state of the information access apparatus, the non-activation-time electric power being lower than the activation-time electric power, the medium access section is operative upon receipt of the activation-time electric power in the power-supplying, and the activation-controlling includes changing the information access apparatus from the non-activation state to the activation state by switching electric power supplied in the power-supplying from the non-activation-time electric power to the activation-time electric power.

16. The information access method according to claim 13, further comprises displaying a matter that the recording medium is not loaded on the medium access section in such a way that the matter is possible to be confirmed from the outside of the information access apparatus, when the activation-controlling permits the no changing.

17. An information processing method in an information processing apparatus having an activation state permitting an information access to a recording medium on which information is recorded, and a non-activation state prohibiting the information access to the recording medium and being changed thereto from the activation state in response to a predetermined operation, the information processing method comprising:

receiving an instruction operation for instructing the ejection of the recording medium by a medium access section which is supplied with electric power in the activation state and is not supplied with electric power in the non-activation state and on which the recording medium is loaded;

activation-controlling including changing from the non-activation state to the activation state in response to the receiving when the recording medium is loaded on the medium access section, while no changing from the non-activation state to the activation state in response to the receiving of the instruction operation when the recording medium is not loaded on the medium access section at the time of the causes of the instruction operation; and processing information accessed by the medium access section.

18. The information processing method according to claim 17, wherein the activation-controlling includes setting up arbitrarily a trigger to change the information processing apparatus from the non-activation state to the activation state, and the information processing method further comprises:

non-activation-controlling including changing the information processing apparatus from the activation state to the non-activation state in response to a predetermined operation; and load-confirming including confirming as to whether the recording medium is loaded on the medium access section when the non-activation-controlling changes the information processing apparatus from the activation state to the non-activation state, and setting up a receipt of the instruction operation by the receiving of the instruction operation as a trigger to change the information processing apparatus from the non-activation state to the activation state to the activation-controlling when it is confirmed that the recording medium is loaded on the medium access section.

19. The information processing method according to claim 17, further comprises power-supplying including supplying an activation-time electric power necessary at time of the activation state of the information processing apparatus, and supplying a non-activation-time electric power necessary at time of the non-activation state of the information processing apparatus, the non-activation-time electric power being lower than the activation-time electric power, the medium access section is operative upon receipt of the activation-time electric power in the power-supplying, and the activation-controlling includes changing the information processing apparatus from the non-activation state to the activation state by switching electric power supplied in the power-supplying from the non-activation-time electric power to the activation-time electric power.

20. The information processing method according to claim 17, further comprises displaying a matter that the recording medium is not loaded on the medium access section in such a way that the matter is possible to be confirmed from the outside of the information processing apparatus, when the activation-controlling permits the no changing.

* * * * *